UNITED STATES PATENT OFFICE.

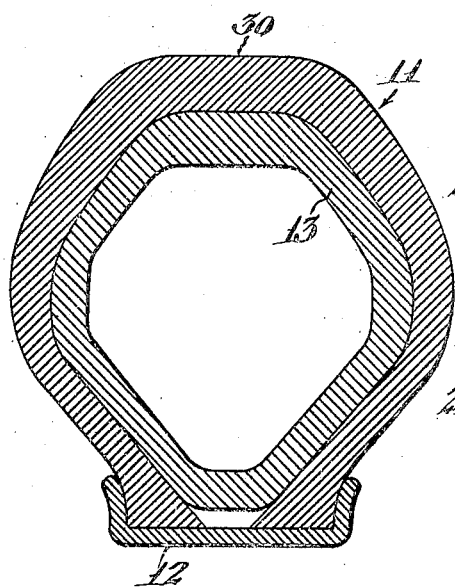
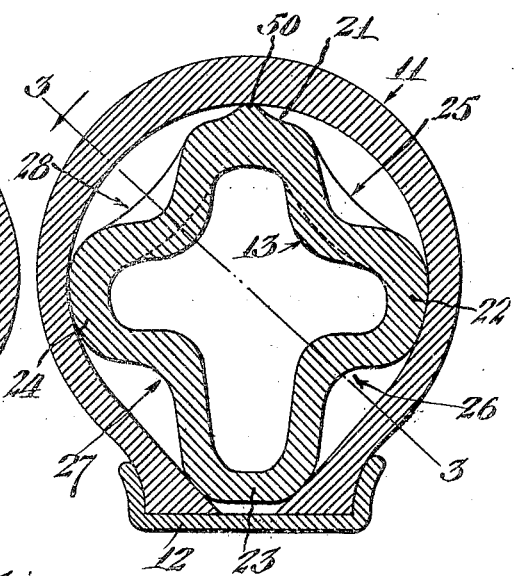
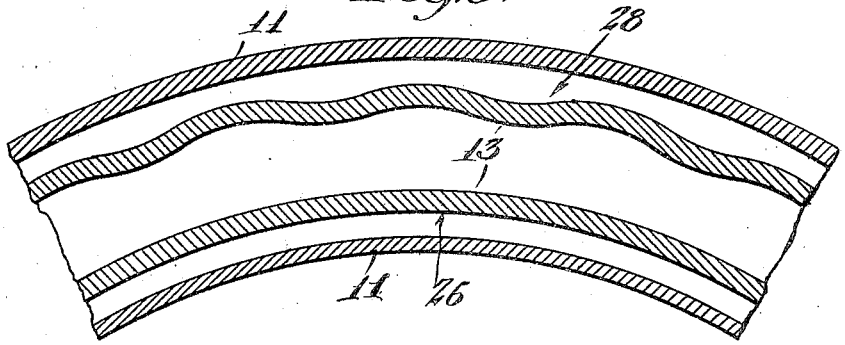

HERMAN LOBEL, OF LOS ANGELES, CALIFORNIA, ASSIGNOR TO ALBERT H. HONEY, OF LOS ANGELES, CALIFORNIA.

PNEUMATIC TIRE.

Application filed November 26, 1920, Serial No. 426,385. Renewed May 29, 1922. Serial No. 564,619.

*To all whom it may concern:*

Be it known that I, HERMAN LOBEL, a citizen of the United States, residing at Los Angeles, county of Los Angeles, and State of California, have invented a new and useful Improvement in Pneumatic Tires, of which the following is a specification.

My invention relates to pneumatic tires and the object is to provide an inner tube which will be superior to the standard type of inner tube now in common use.

A further object of the invention is to provide an inner tube which will not be easily punctured and in which pinching is a practical impossibility.

A further object of my invention is to provide a tire which will not blow out through any tear or cut of moderate size.

A still further object of the invention is to provide an inner tube in which every portion will be under compression when inflated.

A still further object of the invention is to provide a tube which can be readily inserted or withdrawn from a standard casing.

Referring to the drawings which are for illustrative purposes only,

Fig. 1 is a cross-section of my invention in place in a standard casing before being inflated.

Fig. 2 is a similar section after inflation.

Fig. 3 is a partial section on a plane represented by the line 3—3, Fig. 1.

In the form of the invention illustrated, 11 is a standard pneumatic tire casing which is secured on a standard rim 12, and which contains the inner tube 13 which embodies my invention.

This inner tube comprises a hollow ring of elastic material, preferably rubber, having 4 convex ridges 21, 22, 23 and 24 formed therein. These ridges are separated by depressed portions 25, 26, 27 and 28 and the depressed portions 25 and 28 are corrugated, as shown in Fig. 3, that is to say, they are of varying depths so that the distance around their outer surface, on a plane represented by the line 3—3 is as long or preferably somewhat longer than the distance around the periphery of the tire on the outer edge of the ridge 21.

It will be noted that the tire is substantially in the section of a cross.

The method of operation of the invention is as follows:

The inner tube being initially of the form shown in Fig. 1, it will be readily placed in the standard casing, being provided with a standard valve stem, not shown, by which it may be inflated. Upon filling it with compressed air, the depressions 25, 26, 27 and 28 are forced outwardly.

After the inner tube is inflated, it will be noted that the depressions 25, 26, 27 and 28 are forced outwardly and it will be further noted that, considering the cross-section only, the distance around this cross-section is much less with the tire inflated, as shown in Fig. 2, than it is initially as shown in Fig. 1, due to the fact that the depressions 25, 26, 27 and 28 are forced outwardly and thereby shortened. This shortening of the depressions puts all of the material of the inner tube under compression, this compression being exerted along lines in the plane of the paper as viewed in Figs. 1 and 2.

It is a well known fact that rubber under compression immediately closes after being punctured by a sharp foreign object, such as a nail. To render the tire absolutely puncture proof, however, it is essential that this compression should be exerted in every direction. This is a accomplished by corrugating the depressions 25 and 26. The circumferential difference around these depressions measured at right angles to the plane of the paper is decreased as the tire is inflated, the corrugations 25 and 28 being flattened out so that the rubber is put in compression along lines at right angles to the plane of the paper. The depressions 25 and 26 are forced inwardly toward the axis of the tube wall and the circumferential length is materially lengthened so that it is unnecessary to provide corrugations therein to insure a double compression.

For the purpose of increasing the compression at the tread of the tire, I provide a narrow ridge 50 which is forced into the body of the tread when the tire is inflated.

I provide an inner tube which may be punctured repeatedly without material loss of air, the rubber under compression clinging tightly to the foreign body tending to produce puncture and automatically closing when such foreign body is withdrawn.

The depressions 25 and 28 due to their corrugated shape act as vacuum cups to prevent the tube from creeping in the casing. Owing to its thickness which is from three to five times that of conventional inner tubes, the danger of blowouts is greatly reduced, the heavy inner tube bridging across any ordinary cut or tear without blowing out.

I claim as my invention:

An inner tube for use inside the casing of a pneumatic tire comprising a hollow ring of elastic material having four convex ridges extending therearound, said ridges being separated by depressed portions, two of the ridges being symmetrical on either side of an imaginary plane passing through the center of the ring at right angles to the axis of the ring; the other two ridges being each situated between said symmetrical ridges, the depressed portions of said tube on either side of the outer ridge being corrugated to increase their circumferential length.

In testimony whereof, I have hereunto set my hand at Los Angeles, California, this 20th day of November, 1920.

HERMAN LOBEL.